(12) United States Patent
Hsu (10) Patent No.: US 8,170,632 B2
(45) Date of Patent: May 1, 2012

(54) ELECTRONIC DEVICE AND OPERATION METHOD THEREOF

(75) Inventor: Sheng-Chia Hsu, Taipei (TW)

(73) Assignee: Inventec Appliances Corp., Taipei (TW)

( * ) Notice: Subject to any disclaimer, the term of this patent is extended or adjusted under 35 U.S.C. 154(b) by 315 days.

(21) Appl. No.: 12/650,457

(22) Filed: Dec. 30, 2009

(65) Prior Publication Data
US 2010/0197371 A1 Aug. 5, 2010

(30) Foreign Application Priority Data
Feb. 3, 2009 (TW) ................ 98103425 A (51) Int. Cl.
*H04M 1/00* (2006.01)
(52) U.S. Cl. ............... 455/575.4; 455/575.1; 455/575.3; 455/550.1; 16/347; 16/330; 16/342; 16/334; 16/367; 361/679.27; 361/679.3; 361/679.39; 361/679.56; 361/679.58; 248/289; 248/11; 248/917
(58) Field of Classification Search ............... 455/575.4, 455/575.1, 575.3, 550.1; 16/347, 330, 342, 16/334, 367; 361/679.27, 679.3, 679.39, 361/679.56, 679.58; 248/289, 11, 917
See application file for complete search history.

(56) References Cited

U.S. PATENT DOCUMENTS

| | | | | |
|---|---|---|---|---|
| 2007/0293283 | A1* | 12/2007 | Inubushi et al. | 455/575.1 |
| 2008/0287168 | A1* | 11/2008 | Chen | 455/575.1 |
| 2009/0036181 | A1* | 2/2009 | Lee | 455/575.4 |
| 2011/0032667 | A1* | 2/2011 | Kobayashi et al. | 361/679.01 |

* cited by examiner

*Primary Examiner* — Ajit Patel
*Assistant Examiner* — Khai M Nguyen
(74) *Attorney, Agent, or Firm* — Rabin & Berdo, PC (57) ABSTRACT

An electronic device and an operation method thereof are provided. The electronic device includes a fixing element, a first main body and a second main body. The fixing element has a first arc-shaped groove, which passes through the fixing element. The second main body has a second arc-shaped groove and a first straight groove, wherein the second arc-shaped groove and the first straight groove are interconnected. The first main body has a first protrusion which passes through the first arc-shaped groove and lodges in the first straight groove. While the first protrusion is slid for a first predetermined distance from one end of the first straight groove, the first arc-shaped groove and the second arc-shaped groove are overlapped, so that the first protrusion is slid along the first arc-shaped groove which overlaps the second arc-shaped groove for driving the first main body.

20 Claims, 9 Drawing Sheets

ELECTRONIC DEVICE AND OPERATION METHOD THEREOF

This application claims the benefit of Taiwan application Serial No. 98103425, filed Feb. 3, 2009, the subject matter of which is incorporated herein by reference.

BACKGROUND OF THE INVENTION

1. Field of the Invention

The invention relates in general to an electronic device and an operation method thereof, and more particularly to an electronic device with rotatable main body and an operation method thereof.

2. Description of the Related Art

Figure 1:
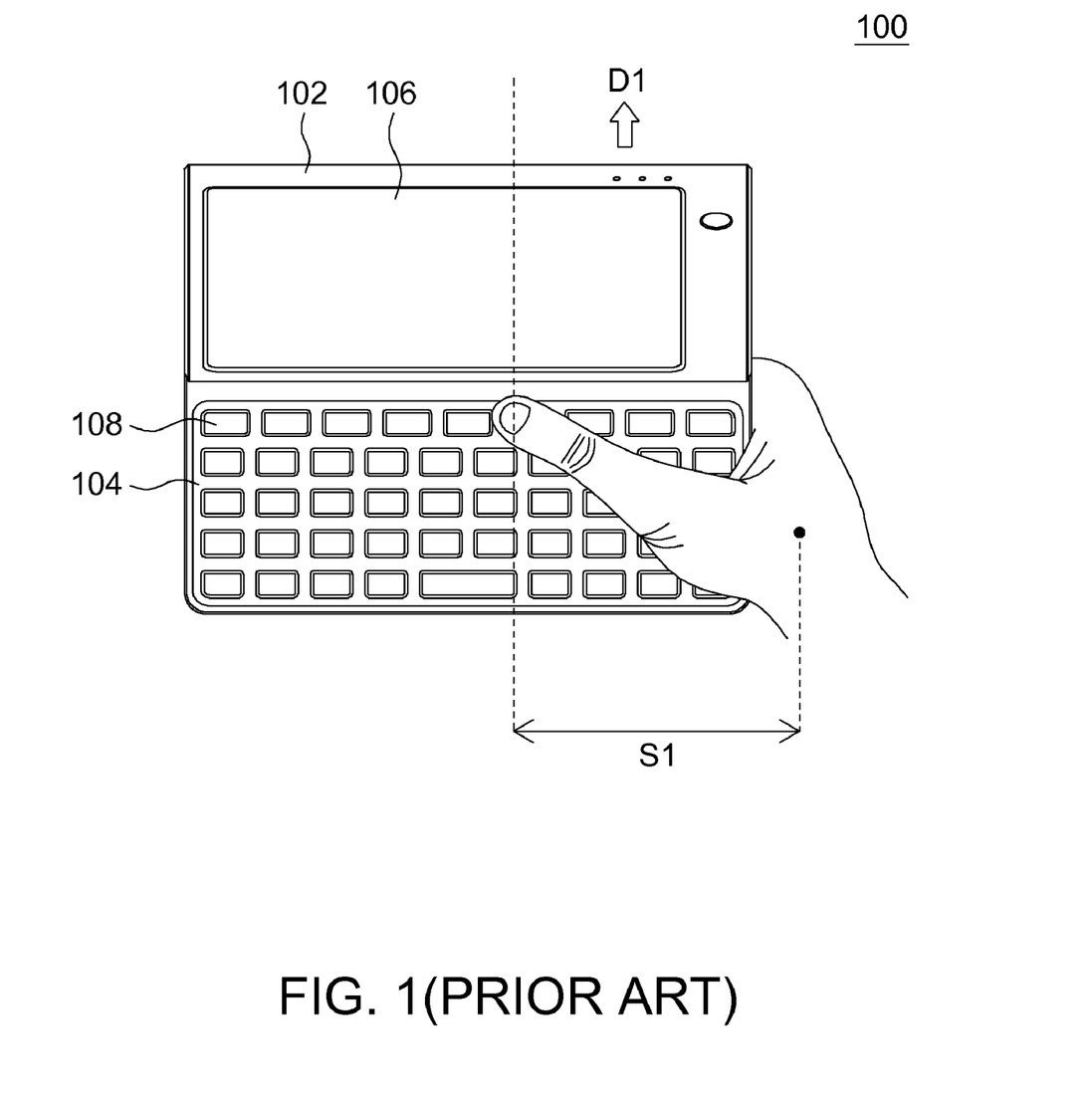
FIG. 1 shows a conventional electronic device.

In order to save space, the display screen and the input unit are normally disposed separately in most of the electronic devices such as mobile phone and personal digital assistant (PDA. Referring to FIG. 1, a conventional electronic device is shown. The electronic device 100 includes a first main body 102, a second main body 104, a display screen 106 and an input unit 108. The display screen 106 is disposed on the first main body 102, and the input unit 108 is disposed on the second main body 104. To operate the electronic device 100, the first main body 102 is pushed for exposing the input unit 108 disposed on the second main body 104.

To operate the input unit 108, the entire input unit 108 needs to be exposed. During the action of sliding the display screen 106, the user needs to hold a large part of the electronic device, and this is indeed very inconvenient. Moreover, during the operation state, the input unit 108 and the display screen 106 are in a horizontal manner, but the interface of the instant telecommunication software of the computer is normally disposed in a vertical manner. Therefore, the user needs to spend some time to adapt the difference. In addition, when the user operates the display screen 106 in a horizontal manner, the force is applied to be the vertical direction D1. Thus, an arm of force S1 is generated, and the user needs to apply a larger force to slide the first main body 102. Normally, the user needs to use both hands to push the first main body 102 out.

SUMMARY OF THE INVENTION

The invention is directed to an electronic device and an operation method thereof. After the first main body is slid for a predetermined distance, the second main body is rotated for exposing an operation unit such as an input unit disposed on the first main body. As there is no arm of force generated in the direction of sliding the first main body, the electronic device and the operation method thereof disclosed in the invention require less applied force.

According to a first aspect of the present invention, an electronic device including a fixing element, a second main body and a first main body is provided. The fixing element has a first element surface, a second element surface, a first arc-shaped groove and a first sliding portion, wherein the second element surface and the first element surface are opposite to each other. The first arc-shaped groove penetrates the fixing element from the second element surface to the first element surface. The first sliding portion is disposed on the second element surface. The second main body has a first main body surface, a second arc-shaped groove, a first straight groove, and a second sliding portion, wherein the first straight groove and the second arc-shaped groove are interconnected, and the second arc-shaped groove, the first straight groove and the second sliding portion are disposed on the first main body surface. The second sliding portion is connected to the first sliding portion. The first main body has a first protrusion, a third main body surface and a fourth main body surface faced to the first main body surface, wherein the third main body surface and the fourth main body surface are opposite to each other. The first protrusion disposed on the fourth main body surface passes through the first arc-shaped groove and lodges in the first straight groove. While the second main body is slid relative to the fixing element and makes the first protrusion be slid for a first predetermined distance from one end of the first straight groove, the first arc-shaped groove and the second arc-shaped groove are overlapped, so that the first protrusion is slid along the first arc-shaped groove which overlaps the second arc-shaped groove for driving the first main body.

According to a second aspect of the present invention, an operation method of electronic device is provided. The operation method includes the following steps. Firstly, an electronic device including a fixing element, a first main body and a second main body is provided. The fixing element has a first element surface, a second element surface, a first arc-shaped groove and a first sliding portion, wherein the first element surface and the second element surface are opposite to each other. The first arc-shaped groove penetrates the fixing element from the second element surface to the first element surface. The first sliding portion is disposed on the second element surface. The second main body has a first main body surface, a second arc-shaped groove, a first straight groove, and a second sliding portion, wherein the first straight groove and the second arc-shaped groove are interconnected. The second arc-shaped groove, the first straight groove and the second sliding are disposed on the first main body surface. The first main body has a first protrusion, a third main body surface and a fourth main body surface faced to the first main body surface, wherein the third main body surface and the fourth main body surface are opposite to each other, and the first protrusion disposed on the fourth main body surface passes through the first arc-shaped groove and lodges in the first straight groove. Next, the second main body is slid, so that the first protrusion is slid for a first predetermined distance from one end of the first straight groove, and the first arc-shaped groove and the second arc-shaped groove are overlapped. Then, the first protrusion is slid along the first arc-shaped groove which overlaps the second arc-shaped groove for driving the first main body.

The invention will become more apparent from the following detailed description of the preferred but non-limiting embodiments. The following description is made with reference to the accompanying drawings.

DETAILED DESCRIPTION OF THE INVENTION

Figure 2A:
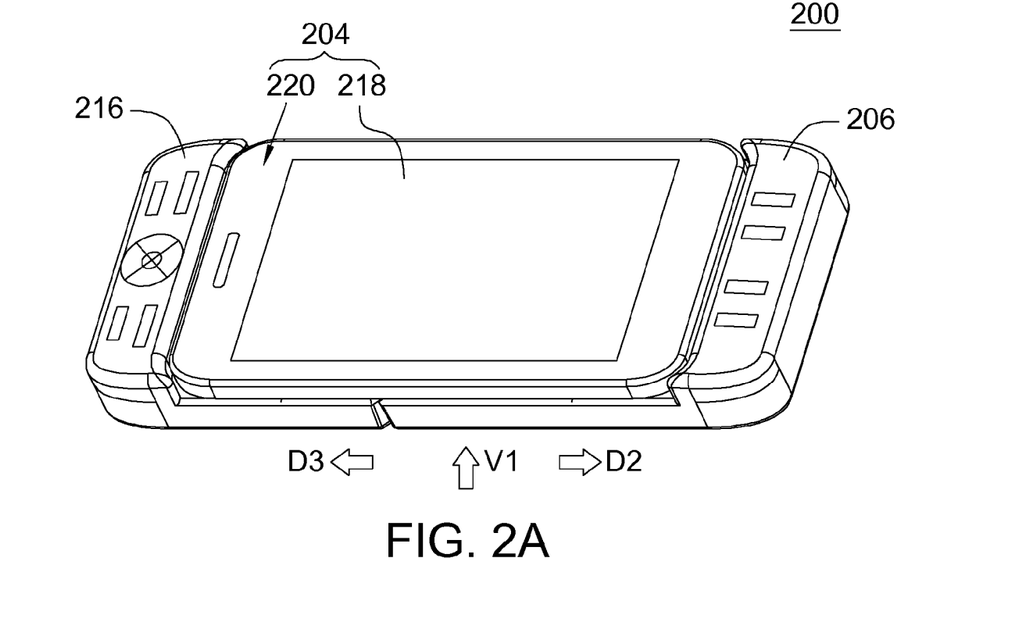
FIG. 2A shows an electronic device according to a preferred embodiment of the invention.
Figure 2B:
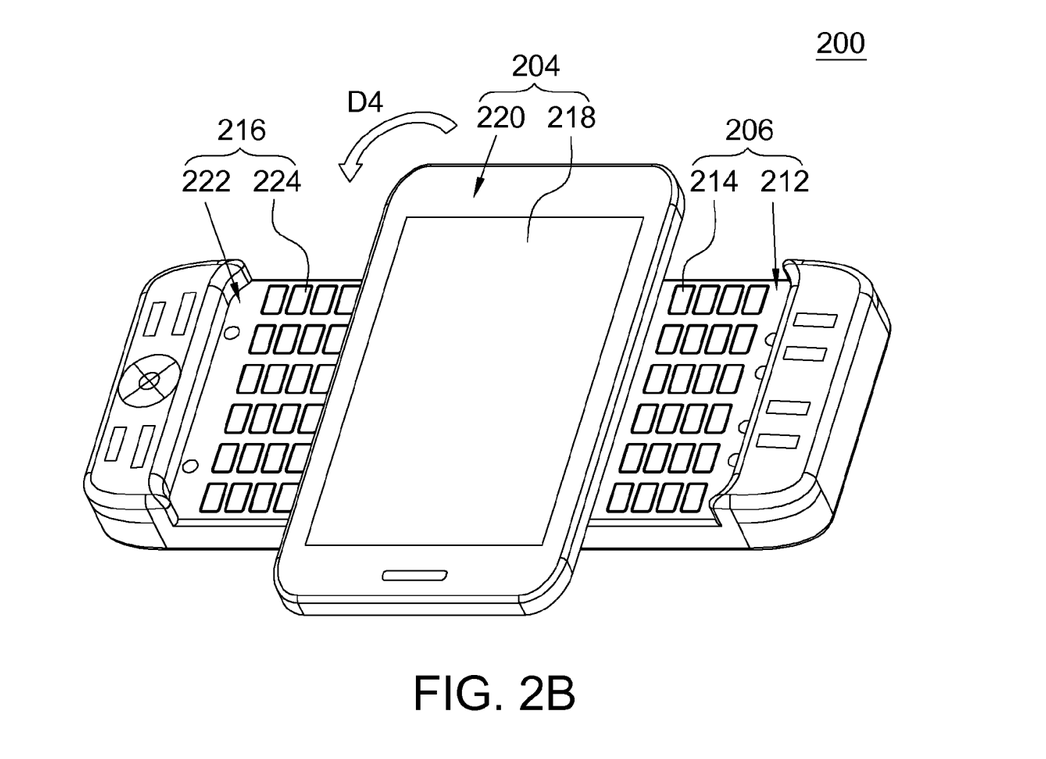
FIG. 2B shows the first main body of FIG. 2A in a vertical manner.

Refer to FIG. 2A and FIG. 2B. FIG. 2A shows an electronic device according to a preferred embodiment of the invention. FIG. 2B shows the first main body of FIG. 2A in a vertical manner. As indicated in FIG. 2A, the electronic device 200 includes a first main body 204, a second main body 206 and a third main body 216. The first main body 204 has a display unit 218 and a third main body surface 220. The display unit 218 is disposed on the third main body surface 220. As indicated in FIG. 2B, the second main body 206 has a first main body surface 212 and a first input unit 214, wherein the first input unit 214 is disposed on the first main body surface 212. The third main body 216 has a second main body surface 222 and a second input unit 224, wherein the second input unit 224 is disposed on the second main body surface 222. In this embodiment, the combination of the first input unit 214 and the second input unit 224 is a QWERTY keyboard. While the second main body 206 is slid for a first predetermined distance L1 (not illustrated in FIG. 2A) in the direction D2 of FIG. 2A and the third main body 216 is slid for a second predetermined distance L2 (not illustrated in FIG. 2A) in the direction D3 of FIG. 2A, the first main body 204 is driven to be rotated. In this embodiment, the first main body 204 is driven to be rotated along the anti-clockwise direction D4 until reaching a vertical manner as indicated in FIG. 2B. That is, the first main body 204 is rotated for 90 degrees.

Besides, the silhouette of the first main body 204 is a rectangular solid. As indicated in FIG. 2A, the direction D2 and the direction D3 are substantially parallel to a long side 208 of the first main body 204.

The structure of the electronic device 200 which includes a fixing element, a second main body linking member, a third main body linking member, a first rotating wing element, a second rotating wing element, a main body linking element and a cover is disclosed below, and the assembly relationships among these elements are disclosed in FIG. 11.

Figure 3A:
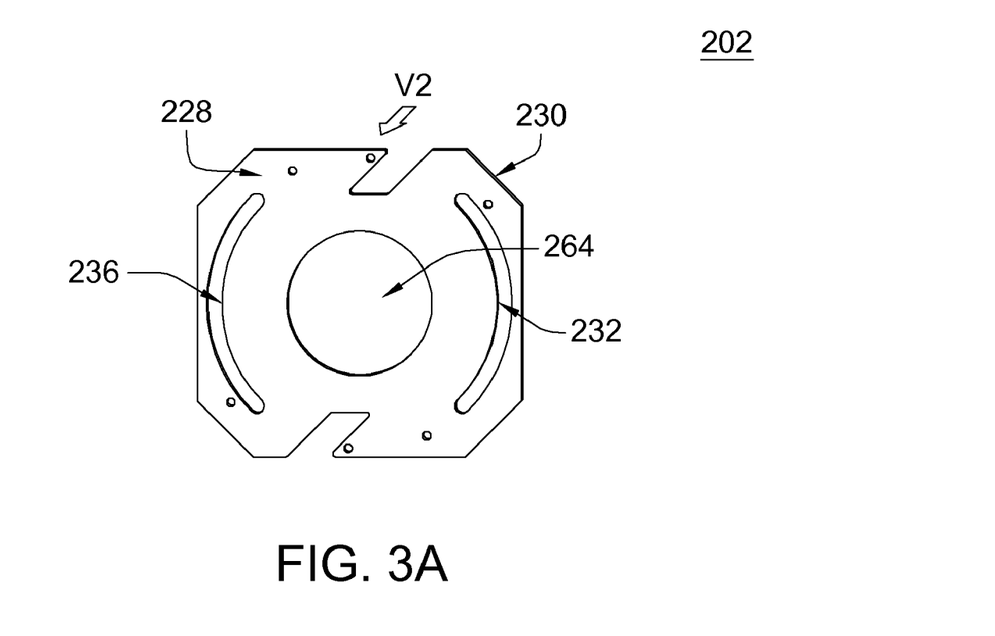
FIG. 3A shows a fixing element of the electronic device of FIG. 2A.
Figure 3B:
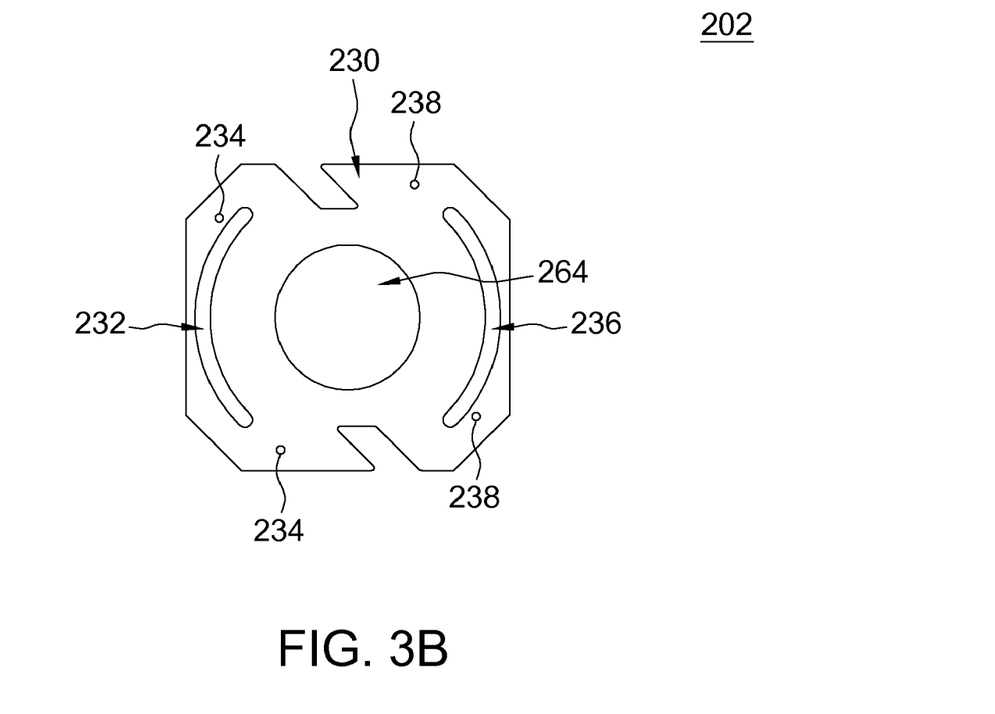
FIG. 3B shows the fixing element of FIG. 3A viewed along the direction V2.

Refer to FIG. 3A and FIG. 3B. FIG. 3A shows a fixing element of the electronic device of FIG. 2A. FIG. 3B shows the fixing element of FIG. 3A viewed along the direction V2. As indicated in FIG. 3A, the electronic device 200 further includes a fixing element 202. The fixing element 202 has a first element surface 228, a second element surface 230, a first arc-shaped groove 232, a first sliding portion 234 (illustrated in FIG. 3B), a third arc-shaped groove 236, a third sliding portion 238 (illustrated in FIG. 3B) and a circular penetrating hole 264, wherein the first element surface 228 and the second element surface 230 are opposite to each other. The first arc-shaped groove 232 and the third arc-shaped groove 236 penetrates the fixing element from the second element surface 230 to the first element surface 228, and the first sliding portion 234 and the third sliding portion 238 are disposed on the second element surface 230, wherein the first sliding portion 234 and the third sliding portion 238 both are protrusions for example. Besides, the center of curvature of the first arc-shaped groove 232 is substantially aligned with the center of the circular penetrating hole 264, the center of curvature of the third arc-shaped groove 236 is substantially aligned with the center of the circular penetrating hole 264, and the angle contained by the central angle of the first arc-shaped groove 232 and the third arc-shaped groove 236 is substantially 90 degrees.

Figure 4:
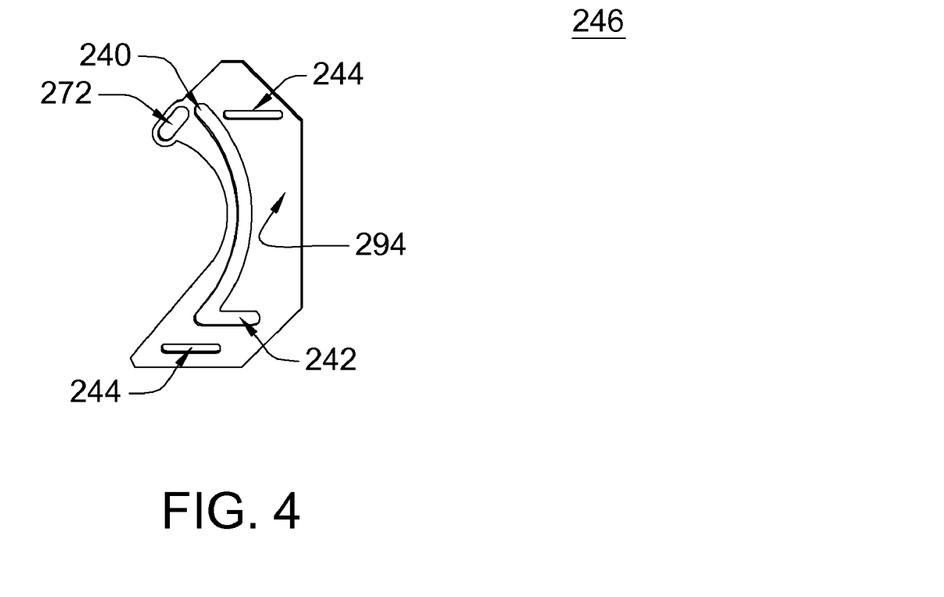
FIG. 4 shows a second main body linking member of the second main body of FIG. 2A.
Figure 5:
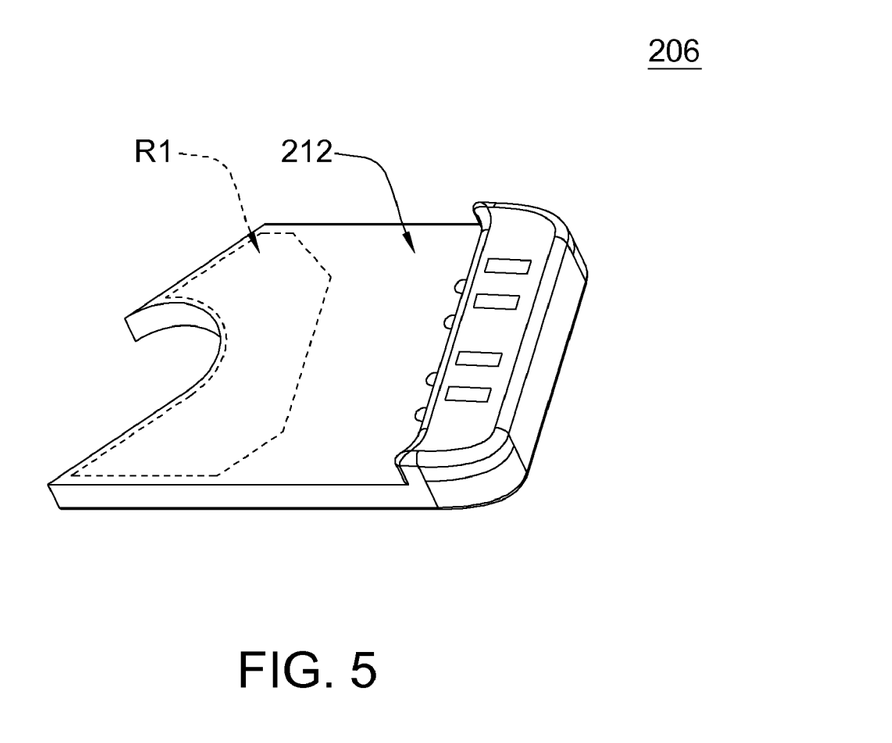
FIG. 5 shows a disposition region of the second main body linking member of FIG. 4.

Refer to FIG. 4 and FIG. 5. FIG. 4 shows a second main body linking member of the second main body of FIG. 2A. FIG. 5 shows a disposition region of the second main body linking member of FIG. 4. As indicated in FIG. 4, the second main body 206 includes a second main body linking member 246, which is fixed on the first main body surface 212 and basically located within the dotted region R1 of FIG. 5. The second main body linking member 246 has a second arc-shaped groove 240, a first straight groove 242, a first protrusion groove 272 and a second sliding portion 244, wherein the second arc-shaped groove 240 and the first straight groove 242 are interconnected. The second sliding portion 244 can be a groove for connecting the first sliding portion 234 (illustrated in FIG. 3B). The length of the first straight groove 242 is greater than or equal to a first predetermined distance L1 (not illustrated in FIG. 4), and the first straight groove 242 is substantially parallel to the direction D2. Besides, when the second main body linking member 246 is fixed on the second main body 206, a surface 294 of the second main body linking member 246 becomes a portion of the first main body surface 212 of the second main body 206. In the present embodiment of the invention, the second arc-shaped groove 240, the first straight groove 242, the first protrusion groove 272 and the second sliding portion 244 are disposed on the second main body linking member 246. However, in other embodiments, the second arc-shaped groove 240, the first straight groove 242, the first protrusion groove 272 and the second sliding portion 244 can be directly disposed on the first main body surface 212, hence saving the cost for manufacturing the second main body linking member 246.

Figure 6:
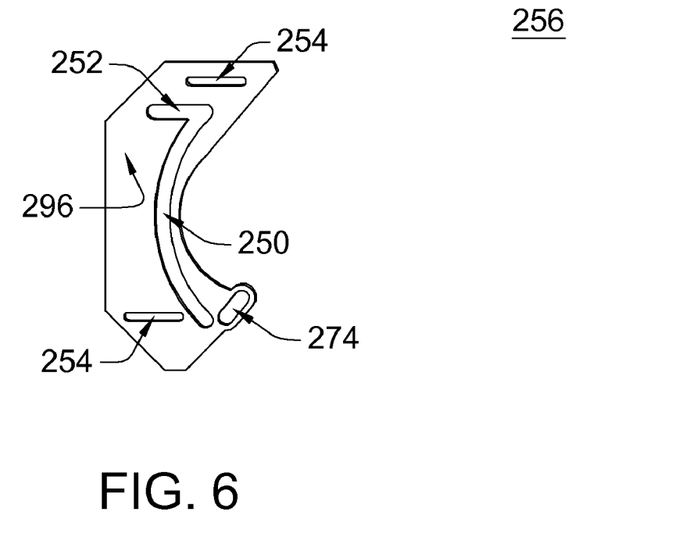
FIG. 6 shows a third main body linking member of the third main body of FIG. 2A.
Figure 7:
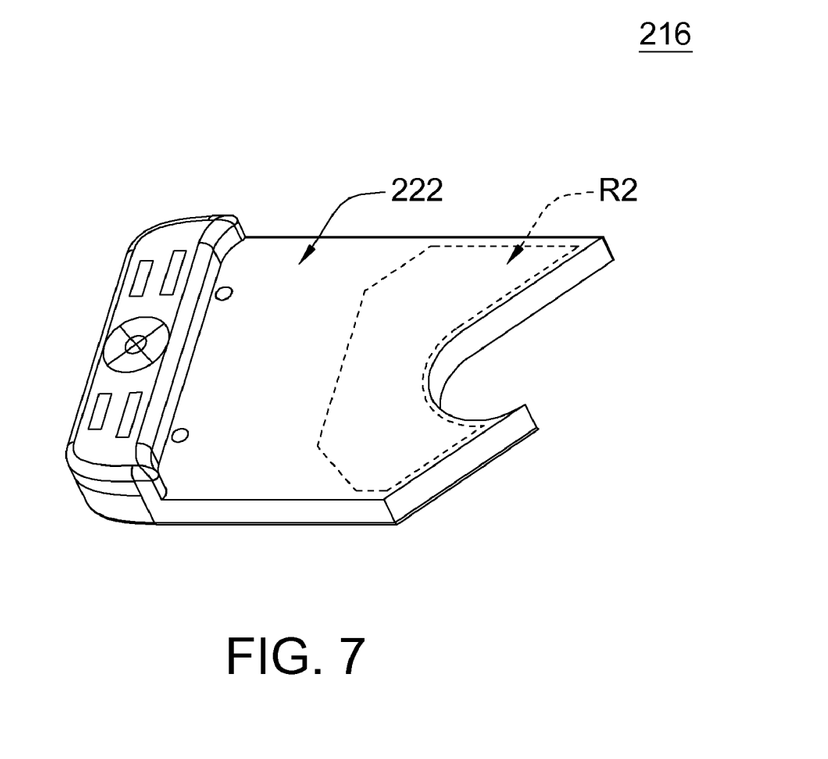
FIG. 7 shows a disposition region of the third main body linking member of FIG. 6.

Refer to FIG. 6 and FIG. 7. FIG. 6 shows a third main body linking member of the third main body of FIG. 2A. FIG. 7 shows a disposition region of the third main body linking member of FIG. 6. As indicated in FIG. 6, the third main body 216 includes a third main body linking member 256, the third main body linking member 256 are fixed on the second main body surface 222 and are basically located within the dotted region R2 of FIG. 7. The third main body linking member 256 has a fourth arc-shaped groove 250, a second straight groove 252, a second protrusion groove 274 and a fourth sliding portion 254, wherein the fourth arc-shaped groove 250 and the second straight groove 252 are interconnected. The fourth sliding portion 254 can be a groove for connecting the third sliding portion 238 (illustrated in FIG. 3B). The length of the second straight groove 252 is greater than or equal to a second predetermined distance L2 (illustrated in FIG. 6), and the second straight groove 252 is substantially parallel to the direction D3. Besides, when the third main body linking member 256 is fixed on the third main body 216, a surface 296 of the third main body linking member 256 becomes a portion of the second main body surface 222 of the third main body 216. In the present embodiment of the invention, the fourth arc-shaped groove 250, the second straight groove 252, the second protrusion groove 274 and the fourth sliding portion 254 are disposed on the third main body linking member 256. However, in other embodiments, the fourth arc-shaped groove 250, the second straight groove 252, the second protrusion groove 274 and the fourth sliding portion 254 can be directly disposed on the second main body surface 222, hence saving the cost for manufacturing the third main body linking member 256.

Figure 8:
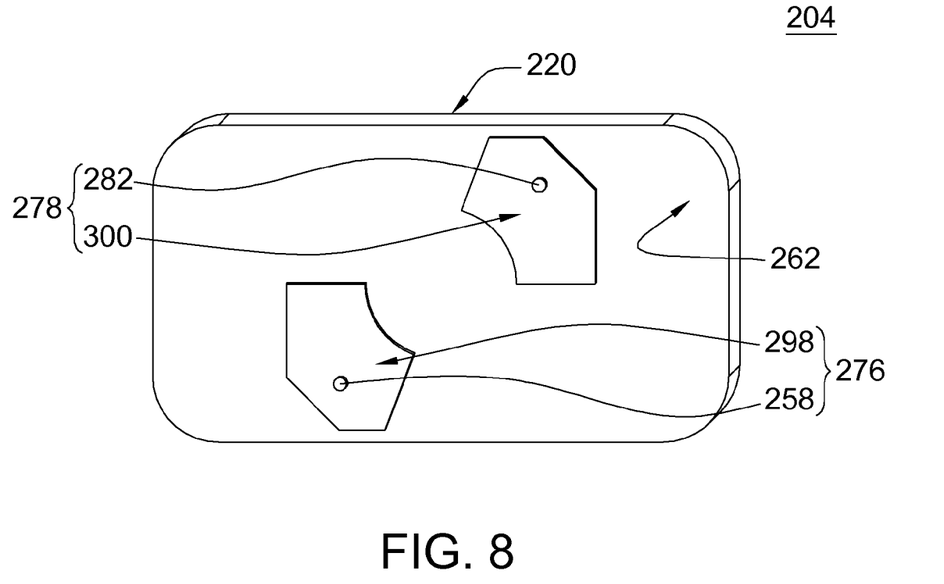
FIG. 8 shows the first main body of FIG. 2A viewed along the direction V1.

Referring to FIG. 8, the first main body of FIG. 2A viewed along the direction V1 is shown. The first main body 204 further includes a first rotating wing element 276, a second rotating wing element 278, a first protrusion 258 and a second protrusion 282. The first main body 204 further has a fourth main body surface 262 faced to the first main body surface 212. The first rotating wing element 276 and the second rotating wing element 278 are fixed on the fourth main body surface 262. The first protrusion 258 and the second protrusion 282 are disposed on the first rotating wing element 276 and the second rotating wing element 278 respectively. Besides, while the first rotating wing element 276 and the second rotating wing element 278 are fixed on the fourth main body surface 262, a surface 298 of the first rotating wing element 276 and a surface 300 of the second rotating wing element 278 become a portion of the fourth main body surface 262 of the first main body 204. In the present embodiment of the invention, the first protrusion 258 and the second protrusion 282 are disposed on the first rotating wing element 276 and the second rotating wing element 278 respectively. However, in other embodiments, the first protrusion 258 and the second protrusion 282 can be directly deposed on the fourth main body surface 262.

Figure 9:
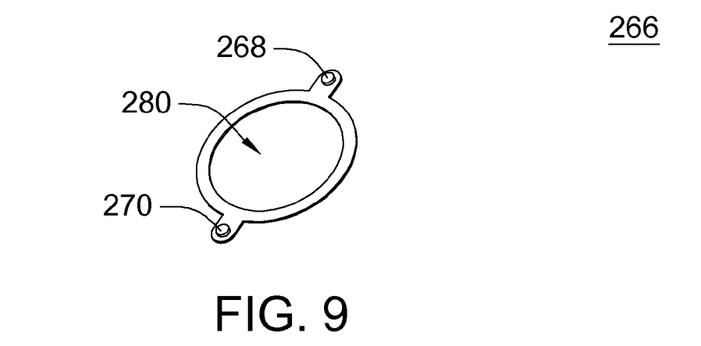
FIG. 9 shows a main body linking element of the electronic device of FIG. 2A.

Referring to FIG. 9, a main body linking element of the electronic device of FIG. 2A is shown. The main body linking element 266 has a first bulge 268, a second bulge 270 and an element penetrating hole 280. The first bulge 268 is lodged in the first protrusion groove 272 of FIG. 4, the second bulge 270 is lodged in the second protrusion groove 274, and the element penetrating hole 280 is for the cover 226 of FIG. 10 to pass through. When one of the second main body 206 and the third main body 216 is slid, the other one of the second main body 206 and the third main body 216 is driven by the main body linking element 266.

Figure 10:
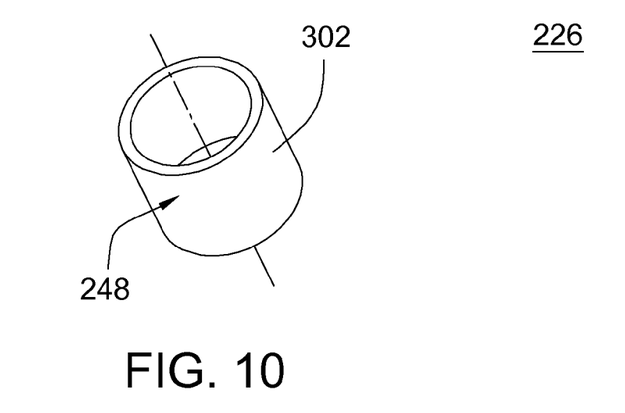
FIG. 10 shows a cover of the electronic device of FIG. 2A.

Referring to FIG. 10, a cover of the electronic device of FIG. 2A is shown. The electronic device 200 further includes a cover 226, which is fixed on the first main body 204 and is projected from the second element surface 230 (illustrated in FIG. 3B) through the circular penetrating hole 264 (illustrated in FIG. 3B). The cover 226 having a cover body 302 and a sidewall 248 restricts the shift of the fixing element 202 and the main body linking element 266 so that the overall structure is further stabilized.

Figure 11:
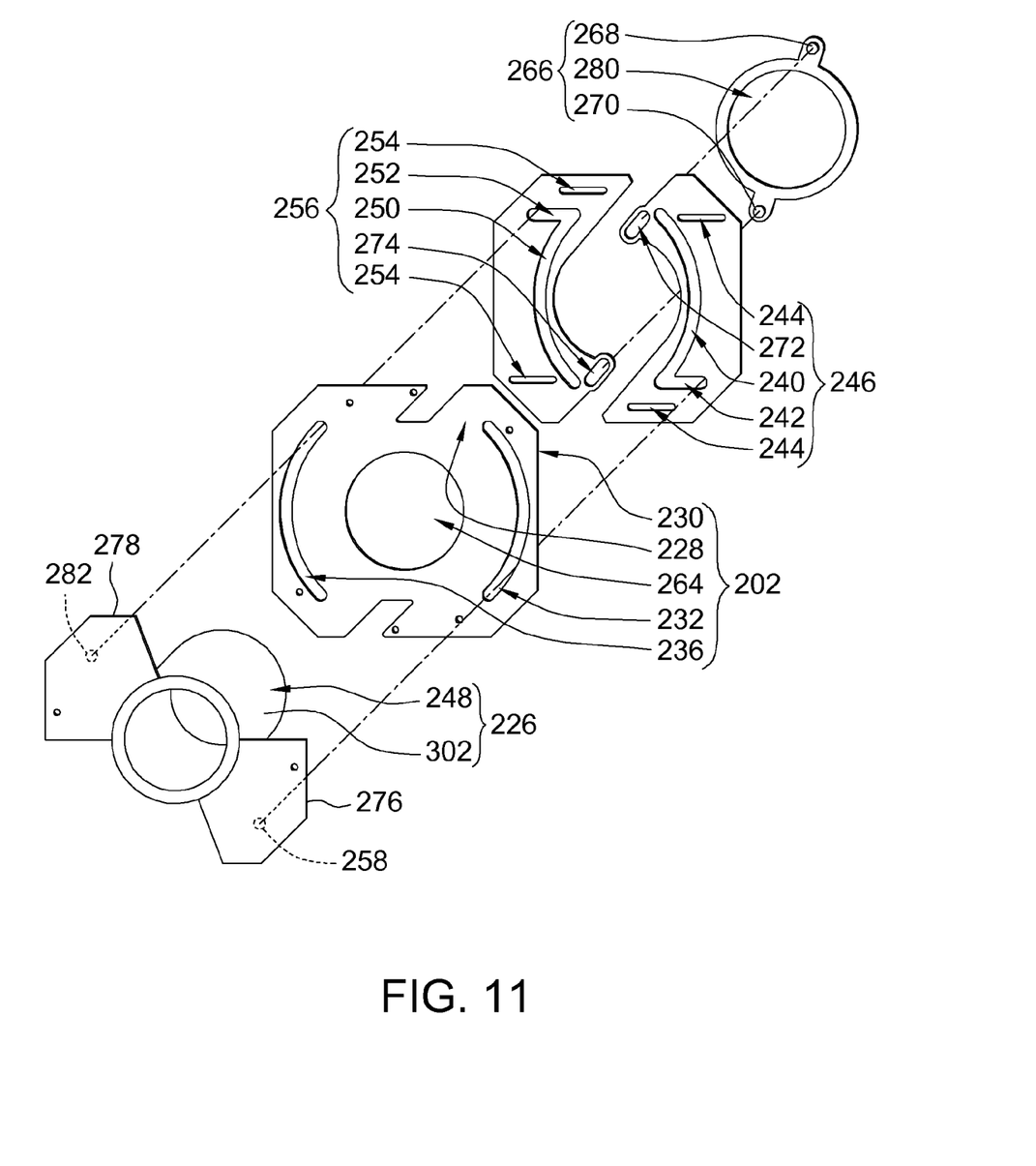
FIG. 11 shows an assembly relationship among a cover, a first rotating wing element, a second rotating wing element, a fixing element, a second main body linking member, a third main body linking member and a main body linking element.
Figure 12:
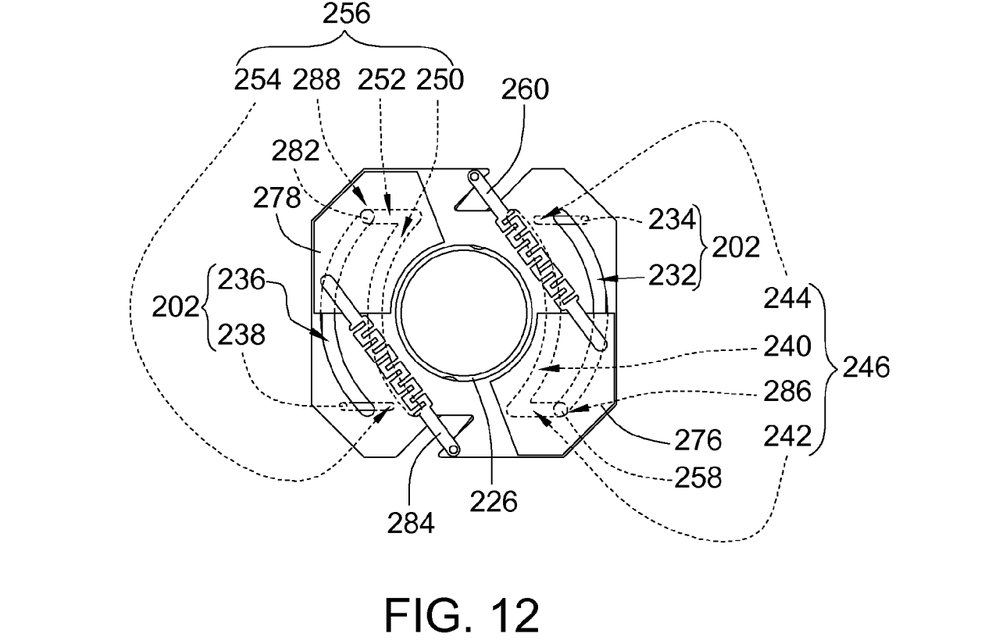
FIG. 12 shows the elements of FIG. 11 after being assembled.

Refer to FIG. 11 and FIG. 12. FIG. 11 shows an assembly relationship among a cover, a first rotating wing element, a second rotating wing element, a fixing element, a second main body linking member, a third main body linking member and a main body linking element. FIG. 12 shows the elements of FIG. 11 after being assembled. As indicated in FIG. 11, the first rotating wing element 276 and the second rotating wing element 278 are connected to a sidewall 248 of the cover 226. The cover 226 passes through the circular penetrating hole 264 and is projected from the second element surface 230, so that the element penetrating hole 280 of the main body linking element 266 is mounted on the cover 226. Besides, the first protrusion 258, which passes through the first arc-shaped groove 232 and lodges in the first straight groove 242, is located at one end 286 (illustrated in FIG. 12) of the first straight groove 242. The second protrusion 282, which passes through the third arc-shaped groove 236 and lodges in the second straight groove 252, is located at one end 288 (illustrated in FIG. 12) of the second straight groove 252. The first bulge 268 is lodged in the first protrusion groove 272, and the second bulge 270 is lodged in the second protrusion groove 274.

Furthermore, by way of lodging the protrusion with the groove and lodging the sliding portions, the cover 226, the first rotating wing element 276, the second rotating wing element 278, the fixing element 202, the second main body linking member 246, the third main body linking member 256 and the main body linking element 266 are firmly and movably joined.

FIG. 12 shows the internal structure of FIG. 2A. That is, while the first main body 204 is disposed in a horizontal manner as indicated in FIG. 2A, the relative positions among the fixing element 202, the second main body linking member 246, the third main body linking member 256, the first rotating wing element 276 and the second rotating wing element 278 are indicated in FIG. 12. As indicated in FIG. 12, the first protrusion 258 is limited by the first straight groove 242, so the first rotating wing element 276 cannot rotate. Moreover, the second protrusion 282 is also limited by the second straight groove 252, so the second rotating wing element 278 cannot rotate either. That is, while the first rotating wing element 276 and the second rotating wing element 278 are located at the positions as indicated in FIG. 12, the first main body 204 cannot be rotated. Thus, when the electronic device 200 of FIG. 2A is used for displaying the contents of the display unit 218, the first main body 204 will not be easily rotated by its own gravity or by an unintentional touch which would otherwise disturbs the user's interest of viewing.

As indicated in FIG. 12, the electronic device 200 further includes a first elastic element 260 and a second elastic element 284. The first elastic element 260 is connected to the first rotating wing element 276 disposed on the first main body 204, and the second elastic element 284 is connected to the second rotating wing element 278 disposed on the first main body 204. The first elastic element 260 and the second elastic element 284 provide an elasticity restoring force to the first rotating wing element 276 and the second rotating wing element 278 respectively.

Figure 13:
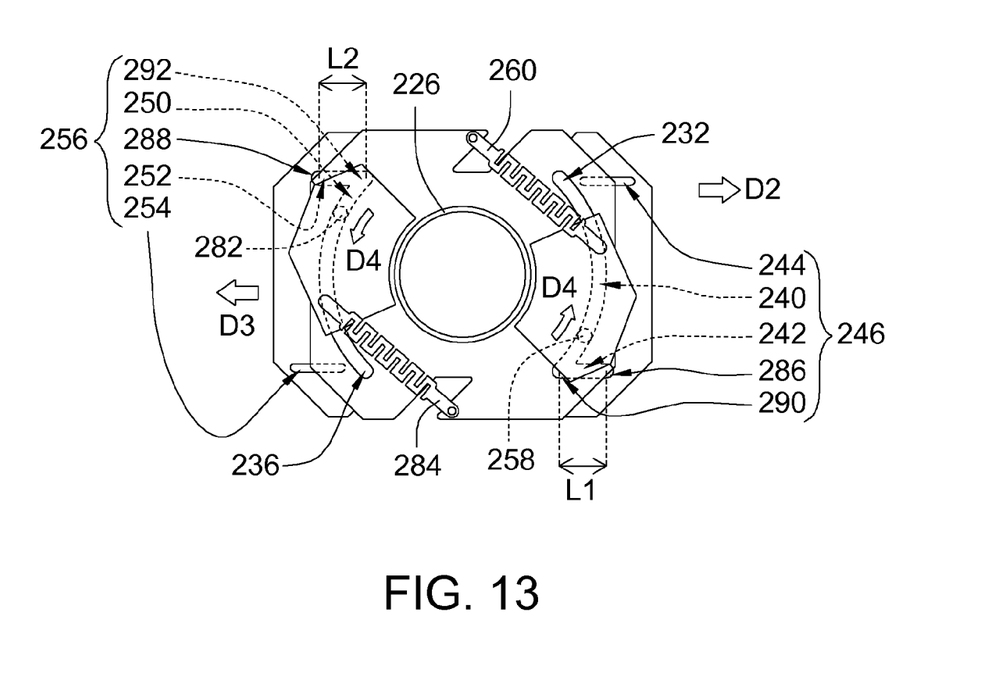
FIG. 13 shows the second main body linking member and the third main body linking member of a preferred embodiment of the invention being slid.
Figure 14:
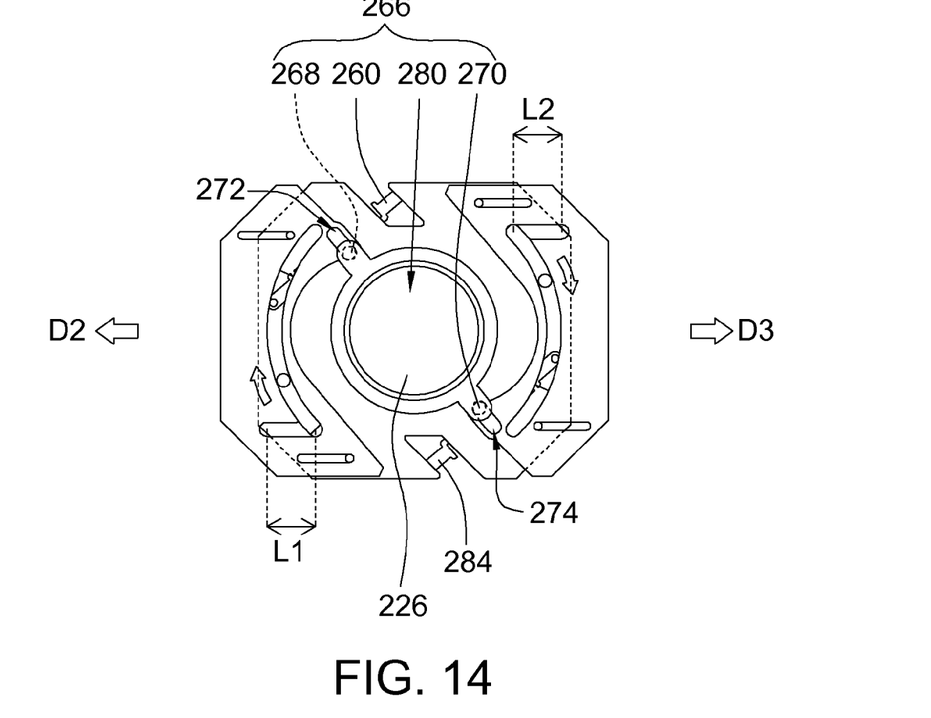
FIG. 14 shows a back view of FIG. 13.

Refer to FIG. 13 and FIG. 14. FIG. 13 shows the second main body linking member and the third main body linking member of a preferred embodiment of the invention being slid. FIG. 14 shows a back view of FIG. 13. As indicated in FIG. 13, while the second main body 206 of FIG. 2A is slid relative to the fixing element 202 along the direction D2 and makes the first protrusion 258 be slid for a first predetermined distance L1 from one end 286 of the first straight groove 242 to the other end 290 of the first straight groove 242, the first arc-shaped groove 232 and the second arc-shaped groove 240 are overlapped, as indicated in FIG. 13. Meanwhile, while the third main body 216 of FIG. 2A is slid relative to the fixing element 202 along the direction D3 and makes the second protrusion 282 relatively be slid for a second predetermined distance L2 from one end 288 of the second straight groove 252 to the other end 292 of the second straight groove 252, the third arc-shaped groove 236 and the fourth arc-shaped groove 250 are overlapped as indicated in FIG. 13. The first predetermined distance L1 is substantially 9 cm for example.

As indicated in FIG. 14, the first bulge 268 of the main body linking element 266 is lodged in the first protrusion groove 272, and the second bulge 270 of the main body linking element 266 is lodged in the second protrusion groove 274. While one of the second main body 206 and the third main body 216 is slid, the other one of the second main body 206 and the third main body 216 is driven by the main body linking element 266. Furthermore, while the second main body 206 is slid by the user for the first predetermined distance L1, the third main body 216 is driven by the main body linking element 266 to slide for the same distance. Preferably, the second predetermined distance L2 is substantially equal to the first predetermined distance L1. Thus, while the first protrusion 258 slides along the second arc-shaped groove 232 which overlaps the first arc-shaped groove 240 for driving the first main body 204 moving, the second protrusion 282 is at the same time driven by the main body linking element 266 and slides to the third arc-shaped groove 236 which overlaps the fourth arc-shaped groove 250. While the user slides one of the second main body 206 and the third main body 216 for the first predetermined distance L1 or the second predetermined distance L2, the first main body 204, on which the first rotating wing element 276 and the second rotating wing element 278 are fixed, is rotated along the anti-clockwise direction D4 (illustrated in FIG. 13). Furthermore, as indicated in FIG. 2B, while the user only needs to slide one of the second main body 206 and the third main body 216 with one hand, the first main body 204 is rotated in the anti-clockwise direction D4, wherein the first main body 204 is driven to rotate by an elasticity restoring force of the first elastic element 260 and the second elastic element 284. Thus, the electronic device 200 can be operated with one hand to make the first main body 204 be rotated automatically. Therefore, the operation becomes even more convenient.

In the present embodiment of the invention, three main bodies (that is, the first main body, the second main body and the third main body) are used for exemplification. However, in other embodiments, two main bodies would do as well. For example, the electronic device can dispense with the third main body 216 and keep the first main body 204 and the second main body 206 only. Thus, after the second main body 206 is slid for the first predetermined distance L1, the first main body 204 still can be rotated either manually or by an elasticity restoring force of the first elastic element 260 automatically.

In the present embodiment of the invention, the first predetermined distance L1 is substantially equal to the second predetermined distance L2. However, in other embodiments, the first predetermined distance L1 does not have to be equal to the second predetermined distance L2. For example, the main body linking element 266 is dispensed with, and the length of the first straight groove 242 is not equal to the length of the second straight groove 252. Thus, the second main body 206 is slid for the first predetermined distance L1 first, and then the third main body 216 is slid for the second predetermined distance L2. Meanwhile, the first protrusion 258 is located at the first arc-shaped groove 232 which overlaps the second arc-shaped groove 240, and the second protrusion 282 is located at the third arc-shaped groove 236 which overlaps the fourth arc-shaped groove 250, so that the first main body 204 is rotatable under such circumstances. Therefore, the value of the first predetermined distance L1 does not have to be equal to that of the second predetermined distance L2, and the value is not limited to the exemplification in the invention.

The center of curvature of the first arc-shaped groove 232 is substantially aligned with the center of the circular penetrating hole 264, the center of curvature of the third arc-shaped groove 236 is substantially aligned with the center of the circular penetrating hole 264, and the angle contained by the central angle of the first arc-shaped groove 232 and the third arc-shaped groove 236 is substantially 90 degrees. Therefore, the rotation angle of the first main body 204 is substantially the same angle, that is, 90 degrees.

Figure 15:
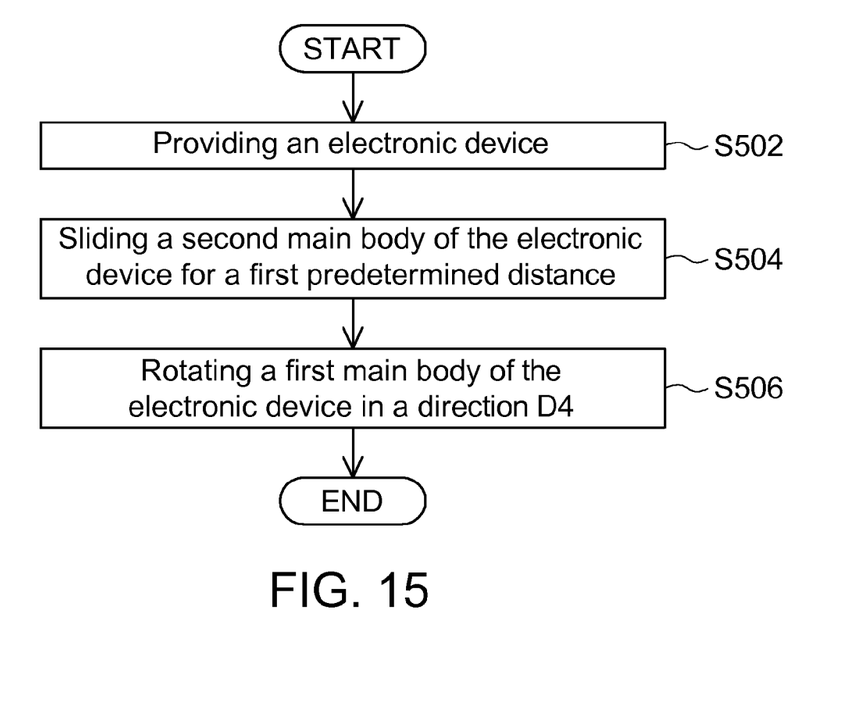
FIG. 15 shows an operation method of an electronic device according to a preferred embodiment of the invention.

Referring to FIG. 15, an operation method of an electronic device according to a preferred embodiment of the invention is shown. The operation method includes the following steps. Firstly, the method begins at step S502, an electronic device 200 is provided.

Next, the method proceeds to step S504, the second main body 206 is slid so that the first protrusion 258 is relatively slid for a first predetermined distance L1 from one end 286 of the first straight groove 242, and makes the first arc-shaped groove 232 overlap the second arc-shaped groove 240. Meanwhile, the main body linking element 266 synchronically drives the third main body 216, so that the second protrusion 282 is relatively slid for a second predetermined distance L2 from one end 288 of the second straight groove 252, and makes the third arc-shaped groove 236 overlap the fourth arc-shaped groove 250, wherein the second predetermined distance L2 is substantially equal to the first predetermined distance L1.

Then, the method proceeds to step S506, the first protrusion 258 is slid along the first arc-shaped groove 232 which overlaps the second arc-shaped groove 240. Meanwhile, the second protrusion 282 is slid along the third arc-shaped groove 236 which overlaps the fourth arc-shaped groove 250. That is, while the first protrusion 258 is located at the first arc-shaped groove 232 which overlaps the second arc-shaped groove 240 and the second protrusion 282 is also located at the third arc-shaped groove 236 which overlaps the fourth arc-shaped groove 250, the first protrusion 258 and the second protrusion 282 are rotated in the anti-clockwise direction D4. Thus, the first main body 204 is synchronically rotated in the anti-clockwise direction D4.

The electronic device and the operation method thereof disclosed in the above embodiment of the invention have many advantages exemplified below:

(1) As the second main body 206 and the third main body 216 are slid along the direction D2 and the direction D3, there is no arm of force generated, and the second main body 206 and the third main body 216 can be conveniently pushed.

(2) The first main body 204 can only be rotated after the second main body 206 is pushed for a distance such as the first predetermined distance L1 and the third main body 216 is pushed for a distance such as the second predetermined distance L2. That is, the first main body 204 being un-rotatable when placed in a horizontal manner is convenient to be carried or packed.

(3) While pushing one of the second main body 206 and the third main body 216 for a predetermined distance, as the main body linking element 266 drives the other one of the second main body 206 and the third main body 216, the electronic device 200 can be operated by one hand during the course of sliding the second main body 206 and the third main body 216.

(4) The first main body 204 can be rotated to be in a vertical manner so as to be conformed to the vertical display of most software, so that the electronic device 200 is even more compatible and user friendly.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic device, comprising:
   a fixing element having a first element surface, a second element surface, a first arc-shaped groove and a first sliding portion, wherein the first element surface and the second element surface are opposite to each other, the first arc-shaped groove penetrates the fixing element form the second element surface to the first element surface, and the first sliding portion is disposed on the second element surface;
   a second main body having a first main body surface, a second arc-shaped groove, a first straight groove and a second sliding portion, wherein the first straight groove and the second arc-shaped groove are interconnected, the second arc-shaped groove, the first straight groove and the second sliding portion are disposed on the first main body surface, and the second sliding portion is connected to the first sliding portion; and
   a first main body having a first protrusion, a third main body surface and a fourth main body surface faced to the first main body surface, wherein the third main body surface and the fourth main body surface are opposite to each other, and the first protrusion disposed on the fourth main body surface passes through the first arc-shaped groove and lodges in the first straight groove;
   wherein, when the second main body is slid relative to the fixing element to make the first protrusion be slid for a first predetermined distance from one end of the first straight groove, the first arc-shaped groove and the second arc-shaped groove are overlapped, so that the first protrusion is enabled to slide along the second arc-shaped groove which overlaps the first arc-shaped groove for driving the first main body moving.

2. The electronic device according to claim 1, further comprising:
   a first elastic element connected to the first main body and the fixing element;
   wherein, the first protrusion is driven to slide along the second arc-shaped groove which overlaps the first arc-shaped groove by an elasticity restoring force of the first elastic element when the first protrusion slides for the first predetermined distance from one end of the first straight groove.

3. The electronic device according to claim 1, wherein the fixing element further has a circular penetrating hole, and the electronic device further comprises:
   a cover fixed on the first main body and projected from the second element surface through the circular penetrating hole.

4. The electronic device according to claim 3, wherein the center of curvature of the first arc-shaped groove is substantially aligned with the center of the circular penetrating hole.

5. The electronic device according to claim 4, wherein the central angle of the first arc-shaped groove is substantially 90 degrees.

6. The electronic device according to claim 1, wherein the first predetermined distance is substantially 9 cm.

7. The electronic device according to claim 1, wherein the second main body comprises an input unit disposed on the first main body surface.

8. The electronic device according to claim 1, wherein the first main body comprises a display unit disposed on the third main body surface.

9. The electronic device according to claim 1, wherein the fixing element further has a third arc-shaped groove and a third sliding portion disposed on the second element surface, the first main body further has a second protrusion disposed on the fourth main body surface, and the electronic device further comprises:
   a third main body having a second main body surface, a fourth arc-shaped groove, a second straight groove and a fourth sliding portion, wherein the fourth arc-shaped groove and the second straight groove are interconnected, the fourth arc-shaped groove, the second straight groove and the fourth sliding portion are disposed on the second main body surface, and the fourth sliding portion is connected to the third sliding portion;
   wherein, the second protrusion passes through the third arc-shaped groove and lodges in the second straight groove, and when the third main body is slid relative to the fixing element to make the second protrusion be slid for a second predetermined distance from one end of the second straight groove, the third arc-shaped groove and the fourth arc-shaped groove are overlapped, so that the second protrusion is enabled to slide along the fourth arc-shaped groove which overlaps the third arc-shaped groove for driving the first main body moving.

10. The electronic device according to claim 9, wherein the first predetermined distance and the second predetermined distance are substantially equal to each other.

11. The electronic device according to claim 9, further comprising:
    a second elastic element connected to the third main body and the fixing element;
    wherein, the second protrusion is driven to slide along the fourth arc-shaped groove which overlaps the third arc-shaped groove by an elasticity restoring force of the second elastic element when the second protrusion slides for the second predetermined distance from one end of the third straight groove.

12. The electronic device according to claim 9, wherein the second main body further has a first protrusion groove, the third main body further has a second protrusion groove, and the electronic device further comprises:
    a main body linking element comprising a first bulge\and a second bulge, wherein the first bulge is lodged in the first protrusion groove, and the second bulge is lodged in the second protrusion groove;
    wherein, when one of the second main body and the third main body is slid, the other one of the second main body and the third main body is driven by the main body linking element.

13. The electronic device according to claim 9, wherein the fixing element further has a circular penetrating hole, and the electronic device further comprises:
    a cover fixed on the first main body and projected from the second element surface through the circular penetrating hole;
    wherein, the center of curvature of the third arc-shaped groove is substantially aligned with the center of the circular penetrating hole.

14. The electronic device according to claim 13, wherein the central angle of the third arc-shaped groove is substantially 90 degrees.

15. The electronic device according to claim 1, wherein the silhouette of the first main body is a rectangular solid;
    wherein, while the first protrusion is located at the first straight groove, the long side of the first main body is substantially parallel to the first straight groove.

16. An operation method of electronic device, comprising:
    providing an electronic device, which comprises a fixing element, a first main body and a second main body, wherein the fixing element has a first element surface, a second element surface, a first arc-shaped groove and a first sliding portion, the first element surface and the second element surface are opposite to each other, the first arc-shaped groove penetrates the fixing element from the second element surface to the first element surface, the first sliding portion is disposed on the second element surface, the second main body has a first main body surface, a second arc-shaped groove, a first straight groove, and a second sliding portion, the first straight groove and the second arc-shaped groove are interconnected, the second arc-shaped groove, the first straight groove and the second sliding portion are disposed on the first main body surface, the first main body has a first protrusion, a third main body surface and a fourth main body surface faced to the first main body surface, the third main body surface and the fourth main body surface are opposite to each other, and the first protrusion disposed on the fourth main body surface passes through the first arc-shaped groove and lodges in the first straight groove;

sliding the second main body to make the first protrusion be slid for a first predetermined distance from one end of the first straight groove, and the first arc-shaped groove overlap the second arc-shaped groove; and sliding the first protrusion along the second arc-shaped groove which overlaps the first arc-shaped groove for driving the first main body moving.

17. The operation method according to claim 16, wherein the electronic device further comprises:

a first elastic element connected to the first main body and the fixing element;

wherein, the first protrusion is driven to slide along the second arc-shaped groove which overlaps the first arc-shaped groove by an elasticity restoring force of the first elastic element when the first protrusion slides for the first predetermined distance from one end of the first straight groove.

18. The operation method according to claim 16, wherein the fixing element further has a third arc-shaped groove and a third sliding portion, the third sliding portion is disposed on the second element surface, the first main body further has a second protrusion disposed on the fourth main body surface, and the electronic device further comprises:

a third main body having a second main body surface, a fourth arc-shaped groove, a second straight groove, and a fourth sliding portion, wherein the fourth arc-shaped groove and the second straight groove are interconnected, and the fourth arc-shaped groove, the second straight groove and the fourth sliding portion are disposed on the second main body surface;

wherein, the second protrusion passes through the third arc-shaped groove and lodges in the second straight groove, and when the third main body is slid relative to the fixing element to make the second protrusion be slid for a second predetermined distance from one end of the second straight groove, the third arc-shaped groove and the fourth arc-shaped groove are overlapped, so that the second protrusion is enabled to slide along the fourth arc-shaped groove which overlaps the third arc-shaped groove for driving the first main body moving.

19. The operation method according to claim 18, wherein the electronic device further comprises a main body linking element, which comprises a first bulge and a second bulge, the second main body further has a first protrusion groove, the first bulge is lodged in the first protrusion groove, the third main body further has a second protrusion groove, the second bulge is lodged in the second protrusion groove, and the step of sliding the second main body comprises:

driving the third main body moving by the main body linking element so that the second protrusion is relatively slid for the second predetermined distance from the one end of the second straight groove and that the fourth arc-shaped groove overlaps the third arc-shaped groove; and sliding the second protrusion along the fourth arc-shaped groove which overlaps the third arc-shaped groove for driving the first main body moving;

wherein, the first predetermined distance and the second predetermined distance are substantially equal to each other.

20. The operation method according to claim 18, further comprising:

a second elastic element connected to the third main body and the fixing element;

wherein, the second protrusion is driven to slide along the fourth arc-shaped groove which overlaps the third arc-shaped groove by an elasticity restoring force of the second elastic element when the second protrusion slides for the second predetermined distance from one end of the third straight groove.

* * * * *